UNITED STATES PATENT OFFICE.

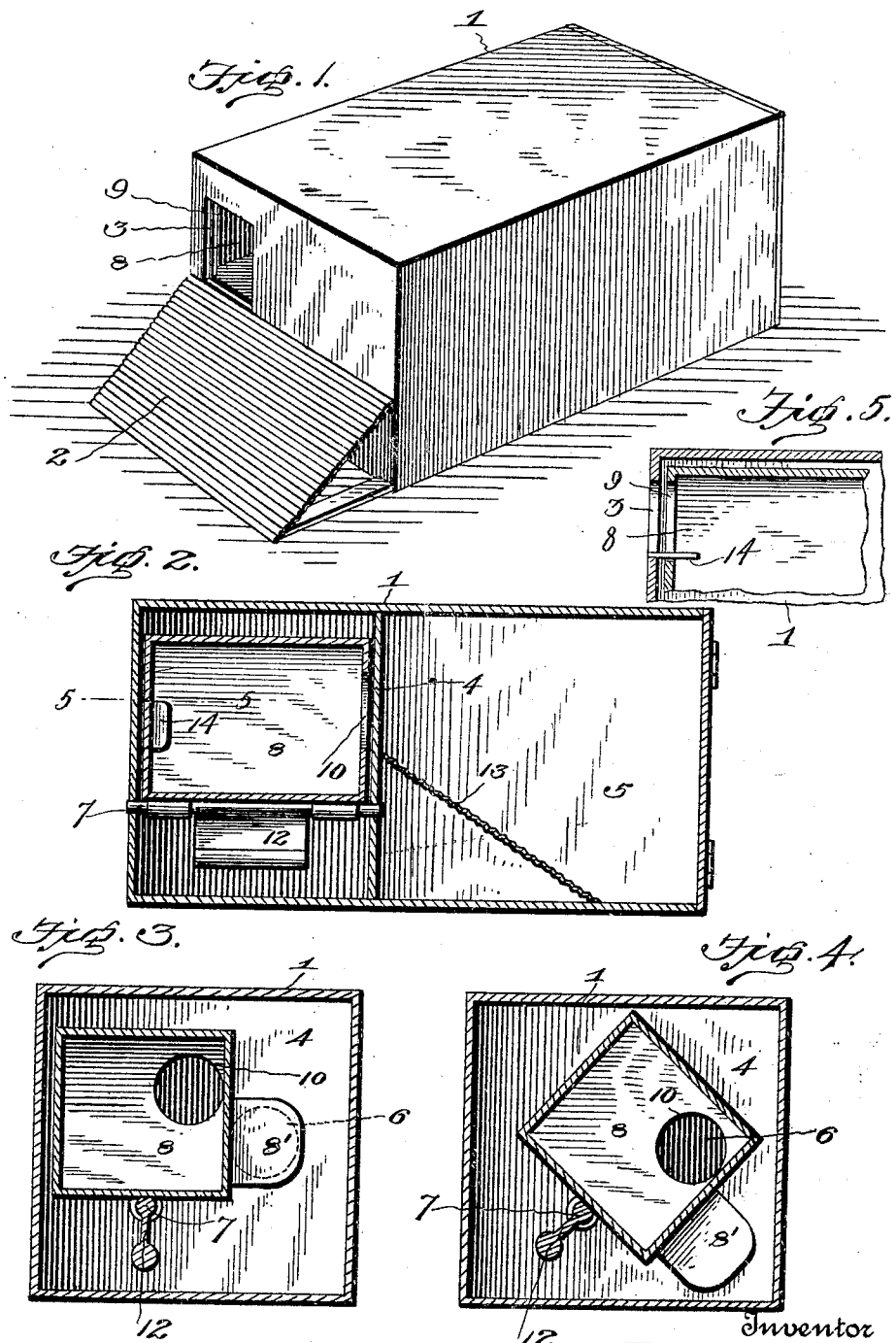

ROBERT L. KIRK, OF DALLAS, TEXAS.

ANIMAL-TRAP.

No. 799,472.     Specification of Letters Patent.     Patented Sept. 12, 1905.

Application filed January 10, 1905. Serial No. 240,472.

*To all whom it may concern:*

Be it known that I, ROBERT L. KIRK, a citizen of the United States, residing at Dallas, in the county of Dallas and State of Texas, have invented certain new and useful Improvements in Animal-Traps; and I do declare the following to be a full, clear, and exact description of the invention, such as will enable others skilled in the art to which it appertains to make and use the same.

This invention relates to improvements in animal-traps.

The object of the invention is to provide a trap of this character having a vestibule which will be operated by the weight of the animal entering the same to close the entrance-door and open an exit-door into a receiving compartment or cage, said vestibule being automatically returned to its normal position after the animal leaves the same, thereby again opening the entrance-door and resetting the trap.

With the above and other objects in view the invention consists of certain novel features of construction, combination, and arrangement of parts, as will be hereinafter described and claimed.

In the accompanying drawings, Figure 1 is a perspective view of the trap. Fig. 2 is a longitudinal vertical sectional view. Fig. 3 is a transverse vertical sectional view through the front end of the trap, showing the vestibule in its normal position or set ready to receive an animal. Fig. 4 is a similar view showing the vestibule tilted and in position to open the door into the receiving box or cage. Fig. 5 is a detail section on line 5 5, Fig. 2.

In the embodiment of my invention I provide a box 1, which may be of any suitable shape and is here shown as rectangular. On the front end of the box is arranged an inclined treadway 2, which is preferably formed of finely-corrugated sheet metal, up which an animal may easily run to an opening or doorway 3, formed in this end of the box above said treadway and to near one side of said end.

Within the box 1 is arranged a transverse vertically-disposed partition 4, which forms in the rear portion of the box a receiving compartment or cage 5. In the partition 4 is formed an entrance-opening or doorway 6, which is arranged near the opposite side of the box from the opening 3 and below the level of the same. Journaled in the front end of the box and in the partition 4 is a horizontal longitudinally-disposed shaft 7, on which is fixed a vestibule or entrance-box 8, in the front and rear ends of which are formed entrance and exit openings 9 and 10. To the shaft 7 is connected a depending weighted bar or plate 12, which is adapted to balance the vestibule 8 in such a manner that the same will be brought to and retained in a normal or receiving position, and in which position the entrance-opening 3 of the box and the entrance-opening 9 of said vestibule-box will be in alinement, thus permitting the entrance of an animal to said vestibule. When the vestibule or entrance-box is in this position, the exit-opening 10 of the same will be closed against the partition 4, and when in this position the entrance-opening 6 in the partition will be closed by an extension 8' on the end of the entrance-box or vestibule.

At the lower edge of the entrance-opening 6 is arranged an inclined treadway 13, which extends to the floor of the cage 5, and down which an animal may run. On the box 1, at the inner edge of the entrance-opening 3, is arranged an inwardly-projecting flange 14, which is adapted to be engaged by the side edges of the entrance-opening 9 of the vestibule-box, whereby the movement of the same will be limited.

In operation as an animal enters the vestibule-box 8 through the alined openings 3 and 9 the least movement made by the animal to the opposite side of the box 8 will cause said box to tilt downwardly, which movement will bring the entrance-opening 9 opposite the end of the box 1, while the exit-opening 10 will be brought opposite or in alinement with the entrance-opening 6 of the receiving-cage of the compartment 5, through which alined openings the animal will pass. Immediately upon the animal leaving the entrance-box or vestibule 8 the weighted bar or plate 12 on the shaft 7 will return the box 8 to its normal position, thereby shutting off the opening 6, thus trapping the animal, and at the same time resetting the extrance-box to receive another animal.

A trap constructed as herein shown and described may be used for capturing all small animals and is particularly well adapted for catching mice. The automatic resetting features of the same will permit an indefinite number of animals to be caught.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

The herein-described animal-trap consisting of a main box having arranged in one end a receiving cage or compartment and in its opposite end an inlet-opening, a vestibule or entrance-box pivotally mounted at the inlet end of said box and having arranged in its opposite ends inlet and outlet openings, said vestibule or entrance-box being normally in position to open the inlet-opening in said main box and to close an inlet-opening formed in said cage or receiving-compartment, a shaft at the bottom of said vestibule and on which said vestibule is centrally journaled, and an overbalancing-weight connected to said shaft for holding said vestibule in set position and by which the same is restored to said position after being tilted by the weight of an animal entering said vestibule, substantially as described.

In testimony whereof I have hereunto set my hand in presence of two subscribing witnesses.

ROBERT L. KIRK.

Witnesses:
P. W. CULLOM,
A. B. RAWLINS.